United States Patent
Haug

(10) Patent No.: US 6,189,223 B1
(45) Date of Patent: Feb. 20, 2001

(54) DEVICE FOR MEASURING VOLUME

(76) Inventor: Werner Haug, Oberstrasse 12, CH-3550 Langnau im Emmental (CH)

( * ) Notice: Under 35 U.S.C. 154(b), the term of this patent shall be extended for 0 days.

(21) Appl. No.: 09/180,638

(22) PCT Filed: Mar. 10, 1998

(86) PCT No.: PCT/CH98/00073

§ 371 Date: Jul. 6, 1999

§ 102(e) Date: Jul. 6, 1999

(87) PCT Pub. No.: WO98/40704

PCT Pub. Date: Sep. 17, 1998

(30) Foreign Application Priority Data

Mar. 11, 1997 (CH) .................................................... 567/97

(51) Int. Cl.⁷ .............................. G01B 11/00; G01B 5/00
(52) U.S. Cl. ............................... 33/1 V; 33/227; 33/121; 356/379
(58) Field of Search ........................... 33/1 V, 1 R, 1 M, 33/227, 121, 122, 123, 124, 503, 547, 546, 545, 815; 356/379, 380

(56) References Cited

U.S. PATENT DOCUMENTS

| | | | |
|---|---|---|---|
| 2,688,878 | * | 9/1954 | Kolisch .................................. 33/1 V |
| 2,736,095 | * | 2/1956 | Krauss ................................... 33/1 V |
| 3,229,621 | * | 1/1966 | Decker et al. ......................... 33/121 |
| 4,268,967 | * | 5/1981 | Brana et al. ............................ 33/1 V |
| 4,953,306 | * | 9/1990 | Weckenmann et al. .............. 33/1 M |
| 5,184,733 | * | 2/1993 | Arnarson et al. ..................... 356/379 |
| 5,251,156 | * | 10/1993 | Heier et al. ............................. 33/503 |
| 5,285,397 | * | 2/1994 | Heier et al. ............................. 33/503 |
| 5,331,118 | * | 7/1994 | Jensen ................................... 33/1 V |
| 5,724,743 | * | 3/1998 | Jackson ............................. 33/203.18 |

FOREIGN PATENT DOCUMENTS 1-41307 * 6/1989 (JP) ....................................... 33/1 V

* cited by examiner

Primary Examiner—Christopher W. Fulton
(74) Attorney, Agent, or Firm—Friedrich Kueffner

(57) ABSTRACT

A volumeter, for determining a volume of an item by measuring the item in at least one of the three main spatial directions defining a volume, has a support surface on which the item rests and a transparent surface moveable in a first one of the three main spatial directions against the item, wherein the transparent surface extends substantially parallel to the support surface and has a side facing away from the support surface. An optical camera is connected to the side facing away form the surface. The camera moves together with the transparent surface and measures a second and third one of the three main spatial directions. The volumeter is used in particular in connection with self-service postal stations.

13 Claims, 1 Drawing Sheet

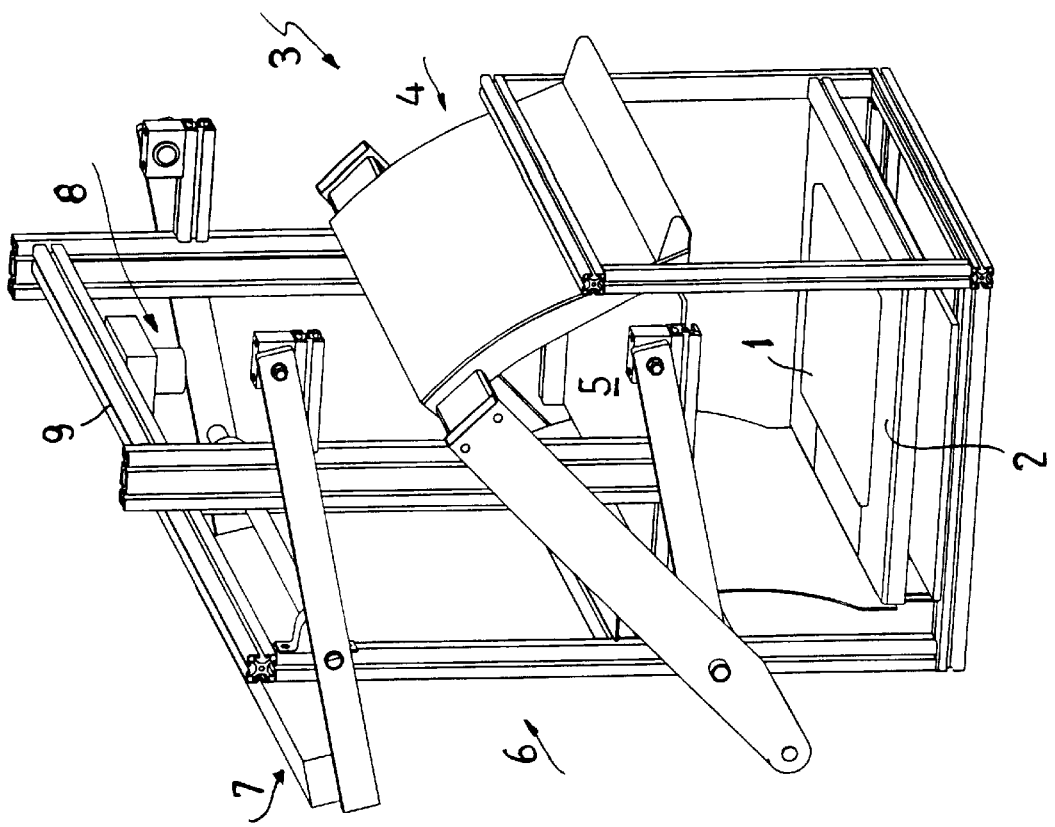
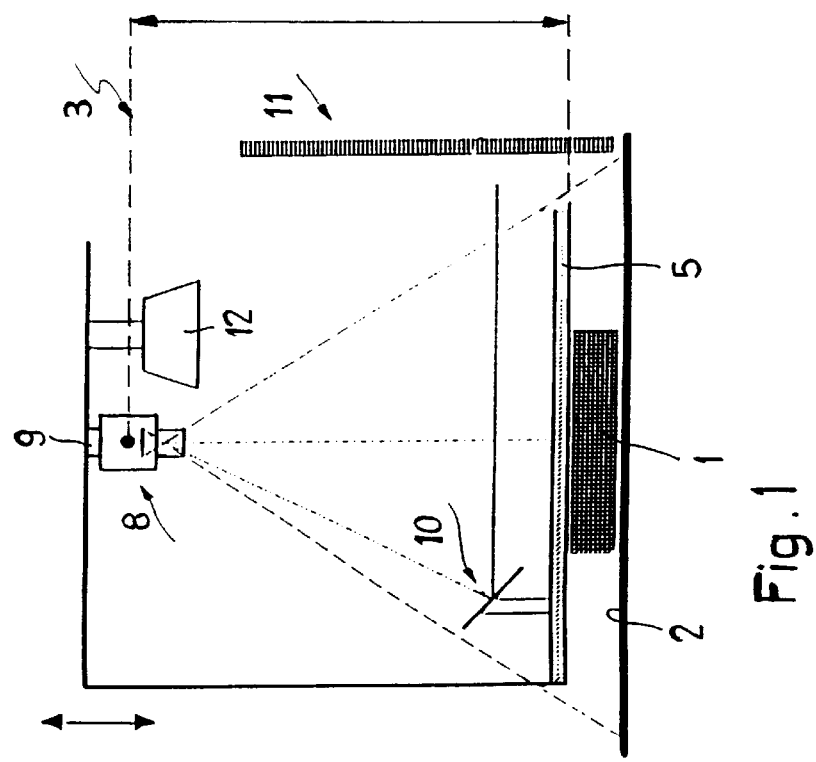

DEVICE FOR MEASURING VOLUME

BACKGROUND OF THE INVENTION

1. Field of the Invention

The present invention pertains to a volumeter.

Devices of this type are suitable for measuring the volume of items with a surface which cannot be measured by simple geometric outlining and/or a surface which has individual structures such as straps, strings, layers of packaging paper, etc., or which is deformable. The device serves primarily but not exclusively to determine the volume of packages or similar items which are to be sent through the mail.

In addition, the invention pertains to a self-service postal station which is equipped with a volumeter of this type.

2. Description of the Related Art

Self-service postal stations of this type are known (see, for example, WO 92/17,861 and EP No. 643,374). At these postal stations, however, it is primarily the weight and not the volume of the postal item which is used to determine the amount of postage required. Only the maximum dimensions of the postal item are limited by mechanical devices (size of the feed slot). Additional light-optic sensors monitor the positioning of the postal item within the acceptance space and its required minimum dimensions. In another known system (Zuhlke Engineering AG, Schlieren-Zurich, Publication No. 66, "Developing New Products and Production Processes with Automation"), a linear light barrier determines the thickness of the item to be mailed (a letter), which is merely inserted into the receiving slot, and an electronic camera determines the surface area of the item. The volume of the letter is then calculated from these two values. To improve the measurement racy, a Fresnel lens is swung between the camera lens and the item being mailed so that the focal points of the camera lens and the Fresnel lens coincide. This solution is expensive, and the measured volume is also negatively affected by various features specific to the item being mailed (material projecting beyond the surface of the item such as flaps of packaging paper, strings, etc.).

The transport costs of an item, however, must often be determined not only on the basis of weight but also on the basis of the volume of the item. It has now been shown that, for a wide variety of reasons (cost, technical complexity, avoidance of damage to the item, etc.), volumes should be measured by means of contactless measuring methods (e.g., light-optic, ultrasonic sensors, etc.). In these measurement methods, however, the disadvantage is that a correct measurement can be disadvantageously affected by the structure and nature of the item. For example, projecting folds or edge reinforcing strips on items wrapped in packaging paper or loosely attached string can cast shadows and thus easily fool the device into concluding the item is larger than it really is. Items which rock back and forth or which fail to come to rest in some other way during the measurement are also measured incorrectly.

SUMMARY OF THE INVENTION

The task was therefore to create a volumeter which does not suffer from the disadvantages described above.

In addition, a self-service postal station is to be created, in which the volumes of all the submitted objects (packages, thick letters, etc.) are detected in a repeatable and defined manner so that the correct postage can then be calculated. It should also be possible for the device to be integrated into postal mailing stations operated by the customer himself or herself without a great amount of effort with respect to construction or operation. It should also be possible for the device to be protected against natural and intentional damage and contamination.

In accordance with the present invention, the volumeter is characterized in that the item to be measured can be acted on in at least one of the three main spatial directions by a surface which can be moved in this direction.

Preferably, the surface is the surface of a solid or grid-like plate, which can be pressed down onto the item by a movable holder at a force or at a constant pressure produced by this force, i.e., under a load which is independent of the surface area of the item acted on by the plate and in that the item to be measured rests on a support surface essentially parallel to the surface.

The two other main spatial directions can be measured by means of an optical camera acting through the surface.

The camera is mounted on the carrier at a fixed distance from the surface and can be moved along the surface.

An illuminating device is provided which is mounted in such a way that no light reflections on the surface or on the carrier of the surface which could interfere with the measurement are visible to the camera and/or in that a polarizing filter is present, by means of which the reflections detected by the camera can be filtered out.

In the area of the surface, a mirror, which moves with the surface, is provided, which projects the coding of a height measurement scale into the lens of the camera, the scale being mounted in a stationary manner with respect to the support surface and oriented in the direction in which the surface moves.

The surface is part of a transparent glass or plastic plate or of a wire or bar grate.

The surface has, for example, a replaceable protective layer or the surface is hardened.

In accordance with the invention, a self-service postal station equipped with the above described volumeter is characterized in that the holder of the surface is connected to a closing device for closing and opening a mail feed slot and/or is driven by it.

The surface which can be laid on the item to be measured stabilizes the item and smooths/conditions the surface of the item in direct contact with the surface.

Optimum results are achieved when the applied force is in the range of only 1–10 N. Because most packages consist of pairs of parallel surfaces, the surface which supports the item is preferably parallel to the surface which presses down on the item. By adjusting the above-cited force, it is possible, of course, to keep the pressure applied to packages of different surface areas constant. In this way, both large and small packages can be subjected to the same specific load.

Of course, this last-mentioned method of applying pressure means that the pressing force must be controlled as a function of the surface area or cross-sectional area of the package. As shown in the following, however, the volumeter has suitable means for determining this area even before the plate presses down on the package. This means that the system which controls the device must be designed in such a way that as soon as the volume-measuring process begins or shortly after it has been initiated, the camera detects a first cross-sectional image of the package, and the computer then converts this image into the (approximate) surface area of the top of the package. On the basis of this area, the computer then calculates the required force to be applied to achieve the desired applied pressure. By means of a simple force-measuring device such as a strain gauge bridge or some other conventional method, this force can be measured in situ after the plate has been set onto the item. The signal thus obtained can be sent as an actual-value signal to a force control unit in the best way available. Because the cross-sectional area of the package required to calculate the force to produce a given applied pressure is determined before the plate makes contact, a (usually) small error in the area can result, but as a rule this is can be readily tolerated. But it is also conceivable, as a way of avoiding this error, to allow the plate to make light, initial contact with the package at a small preliminary pressure. The actual determination of the package volume is then made at a greater applied pressure. Thus the difference between the first-cited, less precise, method and the more precise method explained second can consist in the more complicated programming of the device's computer.

In principle, the dimensions of the item can be detected in all three primary dimensions of space by any desired measuring devices such as mechanical feelers, ultrasonic sensors, or devices based on light-optic measurement principles. The latter, however, are especially suitable, because they allow an exact, contactless measurement. Best results have been obtained by an optical digital camera, which detects two of the three main dimensions of the item through the advisably transparent surface which presses down on the item. When the camera is set up at a fixed distance from the pressing surface, it is possible to use a very simple and inexpensive design which needs no focussing adjustment. The projected image of the item recorded by the camera lens is transmitted to a photosensitive sensor with a large number of individually addressable pixels. By evaluation of the light-dark differences of these pixel signals, an image of the surface of the item is obtained which provides the item's area and circumference.

This image must simply be converted by way of a proportional constant to the effective cross-sectional area of the item and multiplied by the height of the item to obtain its volume. The height of the item is obtained from the position of the pressing surface with respect to the support surface on which the item is resting. This dimension can again be measured in many different ways. For example, a simple sliding contact or a potentiometer connected to the adjusting mechanism of the pressing surface can be used. An especially simple solution is to use the camera itself to measure the height. For this purpose, a 45°-mirror, which sends an image of a stationary measurement scale to the lens, is mounted near the pressing surface. This measurement scale is also detected and recorded by the pixels of the photoreceptor. It is advisable to install a polarizing filter at the entrance to the camera to eliminate reflections of natural or artificial light falling on the item which could negatively affect the measurement. Of course, polarization-corrected light or a suitable lamp position can be used to reduce or avoid altogether the reflections on the plate. Either top lighting or back lighting is suitable, depending on the type of item. Protective layers such as transparent, self-adhesive cover films or the like can be provided on the side of the pressing surface facing the item to protect against natural contamination or vandalism of the plate, which itself serves as a protective shield for the camera and which can be designed in a corresponding manner.

Vapor-deposited or sprayed-on protective layers with a hardness greater than that of the main plate material can also be used.

A self-service postal station in which a volumeter with the features according to the invention is installed is also provided in accordance with the invention. The height-adjustable holding device for the plate can be coupled indirectly to the camera by way of the locking mechanism of the doors or sensors which close off the feed slot or directly by mechanical means.

BRIEF DESCRIPTION OF THE DRAWING

The invention is explained in greater detail below on the basis of the figures:

FIG. 1 shows the measurement principle; and

FIG. 2 shows the height code, seen horizontally from the left in FIG. 1, with the partial area reflected by the mirror.

DESCRIPTION OF THE PREFERRED EMBODIMENT

An item 1, the volume of which is to be measured, i.e., a package (shipment), is laid by the postal customer on a support surface 2 of a self-service postal station 3. By closing the door 4 of the postal station, a glass plate 5 is lowered from above onto the item and pressed down onto it with a certain force.

This force is calculated so that only areas which stick up from the surface of the item such as wavy zones or poorly folded edge areas of the packaging material are pressed down onto item 1 without deforming item 1 in any significant way. As a rule, this force will be a few newtons, i.e., in the range of 1–10 N. If the bottom surface of item 1 bulges out, the rocking movements which inevitably occur when the item is introduced will thus be suppressed.

The adjusting mechanism, which moves glass plate 5 down, can consist of scissors-like levers 6, a rope assembly, or some other type of mechanism. Hydraulically or pneumatically operated cylinder units, however, are also conceivable. The only important point is that the system can be adjusted by means of, for example, counterweights 7 to exert a certain desired plate contact force. The optional use of vibration-damping elements and brake devices is also assumed as known and thus is not described here in any further detail. The elements used to exert the force and/or the vibration dampers and brakes discussed in this paragraph are not described in greater detail here because they are generally known in the field of mechanics and apparatus construction and have been sold and used for many years in a wide variety of forms.

A digital camera 8, which is connected to glass plate 5 by a fixed carrier 9, is carried downward with the plate. Because the lens of this camera 8 is focused on the bottom surface of glass plate 5, it forms an image through glass plate 5, independently of the height of item 1, of the external contour of item 1, an image which is always on the same scale. By means of already known electronic evaluation circuits and software, camera 8 or a computer assigned to it calculates the cross-sectional area of item 1 under glass plate 5. Already known aids in the form of software such as contour analysis programs can be used here to suppress interfering variables such as strings, etc.

A stationary edge measuring scale 11 is simultaneously reflected into the camera lens by a mirror 10, mounted on top of plate 5. This edge measuring scale 11 can be, for example, the diagonal of a rectangle, which is set up in a fixed position with respect to support surface 2, parallel to the direction in which glass plate 5 moves. Depending on the height of glass plate 5, the projection of the diagonal intersects the part of the rectangle reflected by mirror 10 onto camera 8 at a different point. On the basis of a previously performed calibration, the point of intersection can be assigned to a certain height of the bottom surface of the glass plate. Thus, by automatic evaluation of the camera image (horizontal position of the diagonal stripe in the field of the mirror), it is possible to measure the height z of item 1 in question also. In other words: Camera 8 determines all three spatial parameters (x, y, z) by optical means, during which process glass plate 5 is in a stationary position resting on item 1 and lightly pressing down anything sticking up from the item.

The accuracy of the measurement can be adjusted to almost any degree by the selection of the number of measuring pixels of camera 8 and the associated electronic evaluation circuitry or its software. Any reflections on glass plate 5 from artificial illumination 12 which could falsify the measurements can be eliminated either by suitable positioning of the light sources (light rays perpendicular to the surface of the plate) or the use of adjustable polarizing filters on camera 8. Both methods of eliminating reflections can be preadjusted so that only periodic checks need to be made during the useful life of the device.

Of course, the side of glass plate 5 which rests on the item is exposed to mechanical stresses (contamination and surface damage by item 1). It must therefore be maintained. As needed, the surface can be protected by a replaceable protective film (e.g., glued on, shrunk on, or attached in some other suitable manner). Of course, the surface of the plate can also be specially hardened; for example, a thin, transparent layer of metal can be deposited from the vapor phase onto a plate made out of plastic.

In place of a plate which covers the entire area, a grid or a grate can also be used, the holes of which either are left open or are closed by a layer of suitable material such as a film or a casting compound.

Of course, within the scope of the present invention, it is also possible to make various modifications to the design described here. For example, a camera with automatic focusing (e.g., with the help of focussing aids on the glass plate), separate from the transport mechanism of the plate, can be installed in a fixed position. In this case, the electronic data evaluation circuit must include the distance between the camera and the bottom surface of the glass plate, that is, the variable scale of the image) in its volume calculation.

Mirror 10 can be designed as a folding mirror, so that, when glass plate 5 is raised, the overall height of the device is not as great.

The height of glass plate 5 can also be detected by the use of means installed on the adjusting mechanism of the plate itself or by coding provided elsewhere.

Self-service postal stations designed in accordance with the invention operate with high accuracy. Calibrations can be carried out on the basis of test items defined in advance by the post office before the device is put into service for the public.

The invention is not limited to the embodiment described here and illustrated in the figures. Instead, it comprises all devices, apparatuses, and methods in which the principle of the claims is realized or obviously suggested. For example, it is quite conceivable that, besides the plate, additional pressure elements are used to condition appropriately one of the other or all of the other surfaces of the package during the actual volume measurement. For example, the package can be pressed by means of two pressure elements at a right angle to each other into a corner formed by stationary walls. The force or the pressure applied by these pressure elements, which are driven by, for example, known actuators (e.g., linear drives), can be controlled in an open or closed loop. The option is reserved to supplement the claims with parts of the specification/drawing. It is pointed out again that, instead of the designs described here and their individual elements, which are well known to any expert in this field, it is also possible to use other means as long as they accomplish the same or a similar function.

In addition, all conceivable combinations of the individual elements are also to be protected.

What is claimed is:

1. A volumeter for determining a volume of an item by measuring the item in at least one of the three main spatial directions defining a volume, the volumeter comprising:
    a support surface on which the item rests and a transparent surface configured to be moved against the item in a first one of the three main spatial directions, wherein the transparent surface extends substantially parallel to the support surface and has a side facing away from the support surface;
    an optical camera connected to the side facing away from the support surface and configured to move together with the transparent surface and to measure a second and third one of the three main spatial directions.

2. The volumeter according to claim 1, wherein the transparent surface is a solid plate or a perforated plate.

3. The volumeter according to claim 1, comprising a carrier connected to the transparent surface, wherein the optical camera is mounted on the carrier at a fixed spacing relative to the side facing away from the support surface and is configured to be adjusted in the first main spatial direction together with the side facing away from the transparent surface.

4. The volumeter according to claim 3, comprising an illumination device configured to eliminate light reflection on the side facing away from the support surface or on the carrier.

5. The volumeter according to claim 3, wherein the optical camera has a polarization filter configured to eliminate light reflection on the side facing away from the support surface or the carrier.

6. The volumeter according to claim 5, comprising an illumination device configured to eliminate light reflection on the side facing away from the support surface or on the carrier.

7. The volumeter according to claim 3, comprising a mirror connected to the side facing away form the support surface and a measurement scale, provided with a coding in the first main spatial direction relative to the support surface, wherein the mirror is configured to project the measurement scale onto the optical camera.

8. The volumeter according to claim 3, wherein the transparent surface is a part of a transparent glass plate or a transparent plastic plate or a grid plate.

9. The volumeter according to claim 8, wherein the transparent surface is an exchangeable protective layer.

10. The volumeter according to claim 9, wherein the transparent surface is hardened.

11. The volumeter according to claim 9, wherein the transparent surface is hardened.

12. The volumeter according to claim 3, configured to be used in a self-service postal station, wherein the transparent surface has a holder connected to a closing device for closing and opening a mail feed slot of the self-service postal station.

13. The volumeter according to claim 12, wherein the holder is configured to be driven by the closing device.

* * * * *